No. 726,065. PATENTED APR. 21, 1903.
H. ISCOVESCO.
PROCESS OF REFINING AND PRESERVING BUTTER.
APPLICATION FILED AUG. 14, 1902.
NO MODEL. 2 SHEETS—SHEET 1.

Witnesses:
Peter N. Ross
William J. Firth

Inventor:
Henri Iscovesco
By Henry Connett, Atty.

No. 726,065. PATENTED APR. 21, 1903.
H. ISCOVESCO.
PROCESS OF REFINING AND PRESERVING BUTTER.
APPLICATION FILED AUG. 14, 1902.
NO MODEL. 2 SHEETS—SHEET 2.
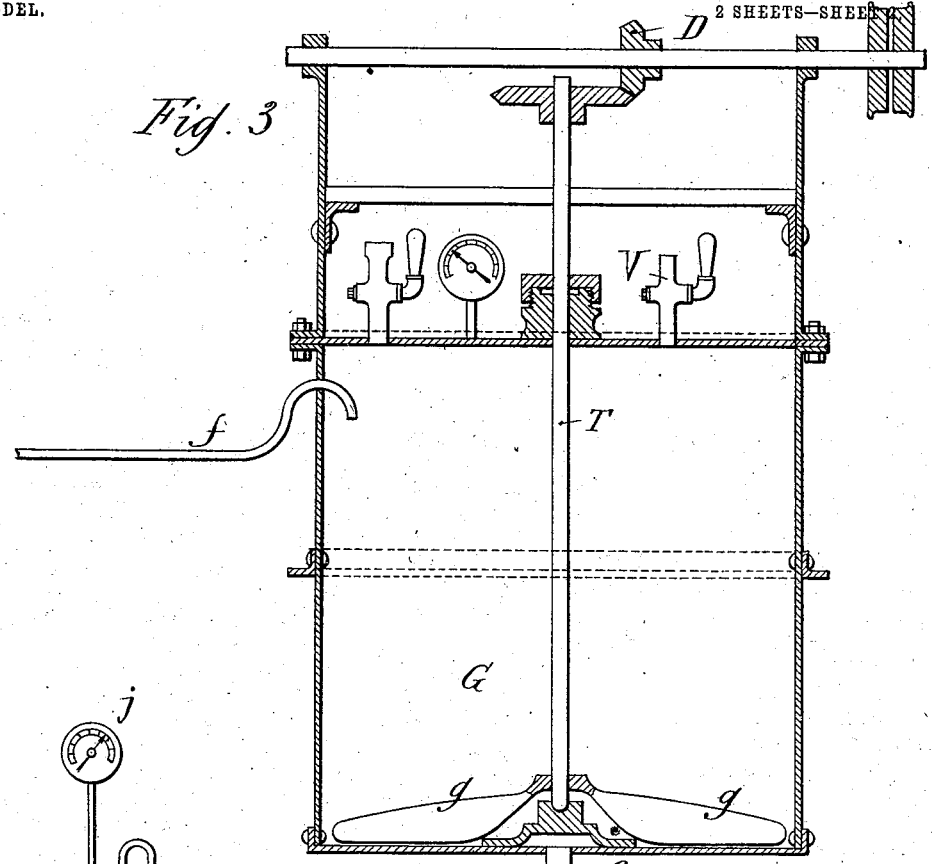
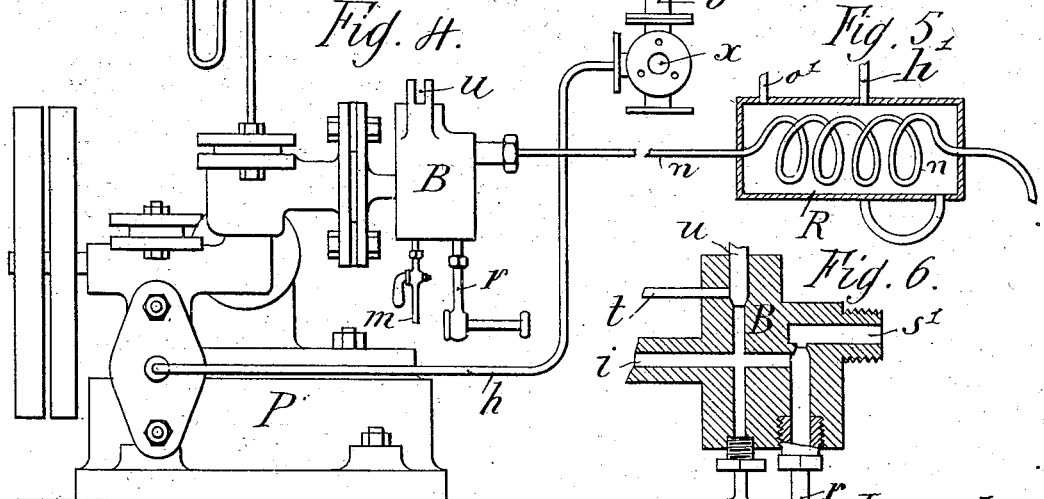
Witnesses:
Peter P. Ross.
William J. Firth.
Inventor:
Henri Iscovesco
By Henry Connett
Attorney.

UNITED STATES PATENT OFFICE.

HENRI ISCOVESCO, OF PARIS, FRANCE, ASSIGNOR TO SOCIÉTÉ FRANCAISE POUR LA CONSERVATION DES BEURRES, OF BOULOGNE, SEINE, FRANCE.

PROCESS OF REFINING AND PRESERVING BUTTER.

SPECIFICATION forming part of Letters Patent No. 726,065, dated April 21, 1903.

Application filed August 14, 1902. Serial No. 119,632. (No model.)

*To all whom it may concern:*

Be it known that I, HENRI ISCOVESCO, a citizen of the French Republic, residing in Paris, France, have invented certain new and useful Improvements in Processes of Treating Butter, of which the following is a specification.

The present invention relates to the treatment of butter for refining it and removing from it the agents which tend to provoke rancidity and limit the length of time during which it may be preserved in a fresh and sweet condition. The process to which the butter is subjected and which will be hereinafter described completely removes from the butter the casein, the albuminoids, and all the impurities contained in it and also the oxygen and carbon dioxid contained in the butter and which render its preservation in an unaltered state very difficult.

Briefly, the process consists in first fusing or melting the butter rapidly, then filtering it, then submitting it simultaneously to centrifugal treatment and washing *in vacuo*, then emulsifying the butter *in vacuo*, and then pumping it through a refrigerator-coil to cool it. In washing the butter it may be salted by using salt dissolved in the sterilized water used for washing.

In order that my process may be the better understood, it will now be described with reference to the accompanying drawings, which illustrate suitable apparatus for carrying out the same. In these drawings—

Figure 1:
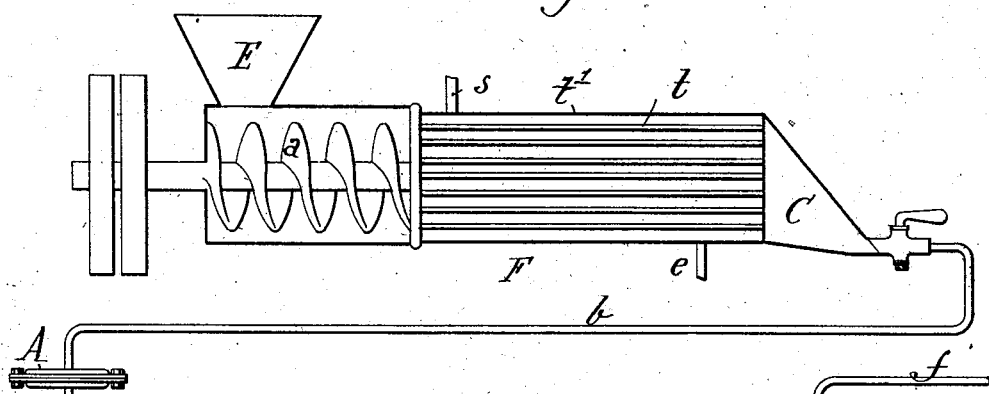
Figure 2:
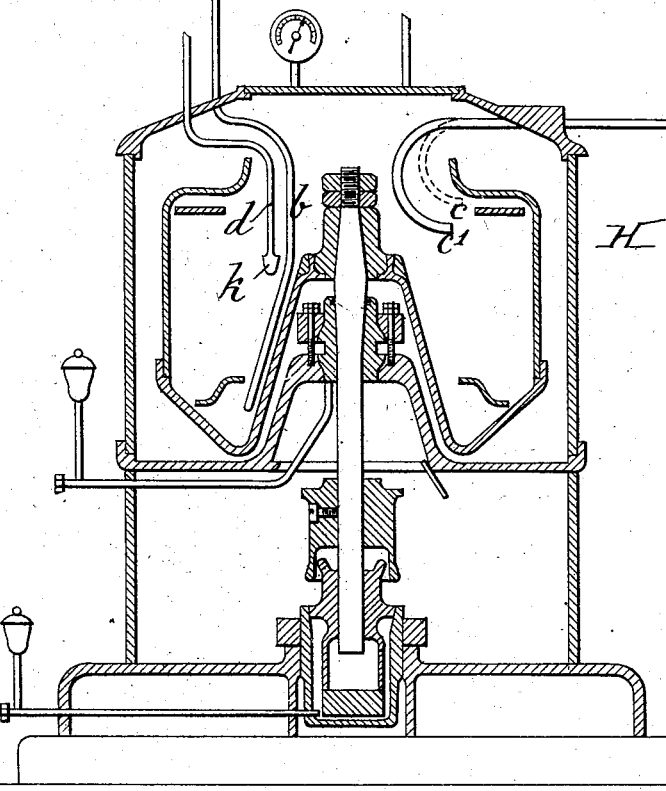

Figure 1 is a sectional elevation of the melting apparatus. Fig. 2 is a sectional view of the centrifugal apparatus, showing also the filter between the melting apparatus and the centrifugal apparatus. Fig. 3 is a sectional elevation of the emulsifier. Fig. 4 is a side elevation of the pump. Fig. 5 illustrates the refrigerator, and Fig. 6 is a sectional detail of the outlet portion of the pump on a larger scale than Fig. 4.

In carrying out the process of this application the following-described procedure is employed:

F in Fig. 1 is the melting apparatus. The butter is introduced at a hopper E and is forced by a screw $a$ through a plurality of tubes $t$, inclosed in a suitable casing $t'$, through which flows hot water, which enters at $e$ and flows out at $s$. The tubes $t$ being immersed in hot water, the butter will be melted in passing through them, thus being melted almost instantaneously. The tubes $t$ may be about eight millimeters in diameter. From the tubes $t$ the molten butter flows into a collector C, of conical form, and passes thence by a pipe $b$ to a filter A, of metal gauze, suited to remove the coarser impurities. From the filter the butter flows into the drum or bowl of a centrifugal apparatus H, provided with means for maintaining in its interior as perfect a vacuum as possible—say up to seventy centimeters, for example. This apparatus has a hermetic cover, with a supply-pipe $b'$ for the butter, a supply-pipe $d$ for sterilized water, a skimmer-pipe $c$ to remove the water, and a skimmer-pipe $c'$ to remove the butter.

While the melted butter is flowing into the drum of the centrifugal apparatus to be freed from casein sterilized water is also admitted through the pipe $d$ and discharged near the drum-axis through an injector or distributer $k$ on the inner end of the pipe $d$. The water in moving outward to the periphery passes through the mass of butter and thoroughly washes it. If desired or necessary, the water admitted to the drum may be charged with alkaline or acid salts, which will act chemically on the butter. The water is finally taken out by the skimmer-pipe $c$ and the butter taken out by the skimmer $c'$.

From the centrifugal apparatus the butter passes by a pipe $f$ to the emulsifier G, (seen in Fig. 2,) where it is also treated *in vacuo*. This apparatus G is a metal vessel tinned or silvered inside and having rotatably mounted in it a shaft T, driven through gearing D of any kind. On the shaft T, near the bottom of the vessel, are oblique propeller-like blades $g$. The shaft T need not rotate rapidly. A speed of twenty-five to forty revolutions per minute will suffice.

V is the cock at the outlet for air in forming the vacuum, and $o$ is the outlet for the butter at the center of the bottom of the vessel.

The butter passes from the outlet $o$ to a pipe $h$, which connects with the inlet of a suction and force pump P, Fig. 4. This pump should be strong and be lined with tin or silver. The joints should be packed with tin also wherever possible and leather for the purpose avoided.

The outlet or discharge portion B of the pump (seen in section, enlarged, in Fig. 6) has some special features. This portion B has the admission-passage $i$ from the pump, a safety-valve $u$, a priming-cock $m$, a discharge-aperture $s'$, and a pin-valve $r$. The valve $r$ is between the inlet $i$ and outlet $s'$ and may be regulated or set so as to more or less choke the flow of butter to the outlet, and thus create a pressure shown at the pressure-gage $j$, which pressure may vary in accordance with the requirements for the moment from one hundred and fifty to two hundred and fifty kilograms. The higher the pressure the finer will the emulsion be.

The butter passes from the pump-outlet $s'$ to a pipe $n$, a part of which pipe is in the form of a coil in a refrigerator vessel or casing R, to which water enters at a pipe $h'$ and flows off at a pipe $o'$. From the refrigerator the butter passes to the molds or suitable vessels.

In the operation about fifteen per cent. of sterilized water is introduced into the emulsifier G with the butter. The rotating blades $g$ serve to mix and emulsify the butter and water, and suitable provision is made for maintaining the temperature in the emulsifier at a mean temperature not exceeding 27° centigrade. The pump P is primed by opening the cock $x$ at the bottom of the emulsifier and, if necessary, the priming-cock $m$ of the pump; but at the moment of priming the pump an inert gas, preferably nitrogen, is admitted to the emulsifier. The butter in passing through the portion B of the pump must be crowded past the pin-valve $r$ and emerges as fresh butter. After being cooled by the refrigerating device it may be collected, molded, and prepared for market.

Where salt is added or dissolved in the water used in the process, an accurate distribution of salt through the mass of butter will be attained.

One of the essential conditions of my process which must always be observed is the absolute exclusion of oxygen and carbon dioxid from the butter during the operation. To effect this, either a vacuum is maintained in the apparatuses employed or an inert gas, such as nitrogen or hydrogen, is introduced at atmospheric pressure to displace any oxygen, air, or carbon dioxid that may be present. It will therefore be understood that by the term *in vacuo* as herein used is meant the operation performed with exclusion of oxygen and carbon dioxid.

Having thus described my invention, I claim—

1. The herein-described process of refining and preserving butter, which consists in fusing the butter nearly instantaneously at a temperature of about 35° centigrade and in a vacuum of about seventy centimeters of mercury, and then treating the molten butter mixed with sterilized water centrifugally under the same vacuum for the removal therefrom of the solid and liquid impurities, the time occupied in melting the butter not exceeding one minute, whereby loss of natural aroma of the butter is avoided.

2. The herein-described process of refining and preserving butter, which consists in first forming an emulsion of the purified molten butter with sterilized water *in vacuo*, and then submitting the mixture, while in a liquid state, to the influence of a refrigerating agent.

In witness whereof I have hereunto signed my name in the presence of two subscribing witnesses.

HENRI ISCOVESCO.

Witnesses:
    EDWARD P. MACLEAN,
    GABRIEL BELLIARE.